W. B. PALMER.
Smut Mill.
No. 2,057.  Patented April 19, 1841.
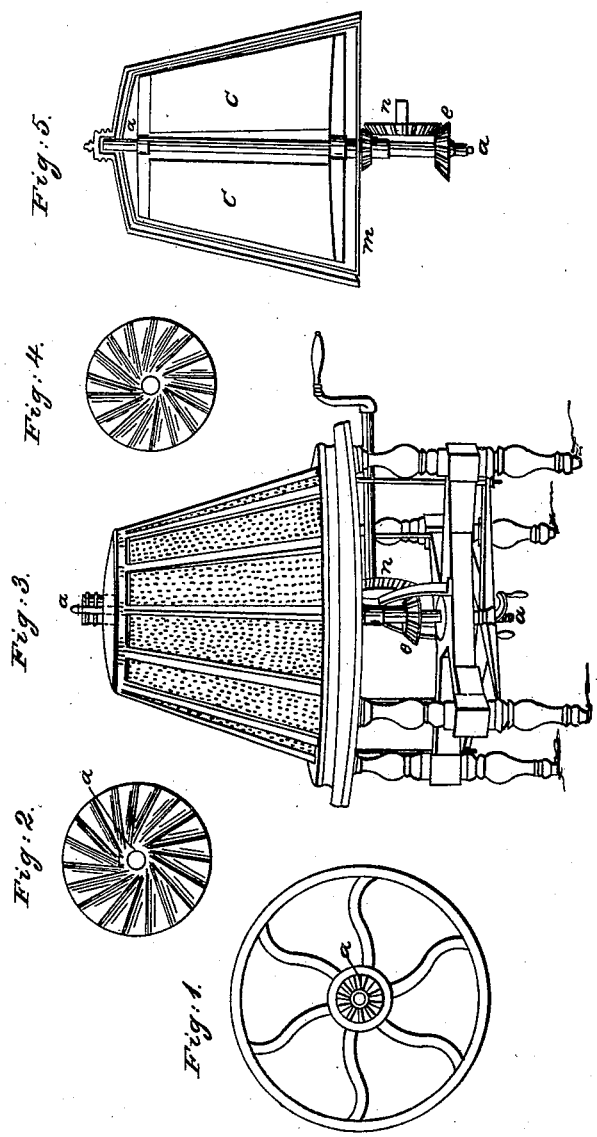

UNITED STATES PATENT OFFICE.

WM. B. PALMER, OF ROCHESTER, NEW YORK.

SMUT-MACHINE.

Specification of Letters Patent No. 2,057, dated April 19, 1841.

*To all whom it may concern:*

Be it known that I, WILLIAM B. PALMER, of the city of Rochester, in the county of Monroe and State of New York, have invented new and useful Improvements in Smut-Machines in Common Use for Cleaning Grain; and I do hereby declare that the following is a full, clear, and exact description of the construction and operation of the same, reference being had to the annexed drawings, making a part of this specification, in which—

Figure 1 is a view of the horizontal base on which the inner cone rests and of the pinion wheel by which it is made to revolve. Fig. 2 is a drawing of the fluted inner surface of the head of the outer cone. Fig. 3 is a perspective view of the whole machine. Fig. 4 is a drawing of the fluted outer surface of the head of the inner cone, and Fig. 5 is a view in section of the two cones and their heads, also of the fan attached to the perpendicular spindle, and the pinion wheel and other gearing which make the fan revolve.

The nature of my invention consists in placing a fan within the inner frustum of a cone or cylinder which revolves in a direction contrary to the inner cone, as hereinafter described, and drives out all the smut and dirt made loose by the action of the machine—also in making grooves on the inner surface of the head of the outer cone and on the outer surface of the head of the inner cone, so as to scour the wheat by friction at the head of the machine even before it passes down into the machine.

To enable others skilled in machinery to make and use my improvements, I will proceed to describe their construction and operation.

I take any smut machine of the form commonly used, having an outer and an inner cone or cylinder perforated with holes, and to the center spindle or shaft (*a a* in Figs. 3 and 5) I attach a fan of metallic plates (as *c c* on Fig. 5) composed of any number of plates as wished. Near the bottom of this shaft (as *e* in Figs. 3 and 5) is a small pinion wheel firmly attached; and a cog wheel and shaft (as *n* on Figs. 3 and 5) is made to move on the said pinion wheel, when a power applied causes the fan to revolve with great velocity. The inner cone is made to rest on a circular base (as Fig. 1, see its section *m* on Fig. 5). In the center of that base is a pinion wheel (*a* on Fig. 1, *o* on Fig. 5) which last named wheel is attached to the center spindle (at *o* on Fig. 5) and rests on the aforesaid cog wheel and is made to revolve by it, but in a direction different from the fan which moves by the pinion wheel under the cog wheel. Again the upper end or top of the outer cone has not a smooth, plane inner surface, as is usual but I make this surface grooved or fluted after the manner of a mill stone surface (see Fig. 2). The orifice for the wheat to enter the machine is near the center of this head (*a* on Fig. 2). In like manner I make fluted the upper surface of the head or top of the inner cone (Fig. 4). The wheat or grain then enters the machine at the top orifice and is scoured in the grooves on the head, then falls down and passes through the machine—the powerful action of the fan drives off all smut and dirt as soon as disengaged, and the grain comes out perfectly bright and cleansed.

I disclaim the original invention of the smut machine, and

What I claim as my invention, and desire to secure by Letters Patent are the following improvements, viz:

1. The combination of the fan with the cones in the manner set forth; the internal cone being perforated and constructed with a fluted head; and having the fan arranged and moved within it as described.

2. Also the combination of these, so constructed and arranged, with the external cone as described.

WILLIAM B. PALMER.

Witnesses:
RICHARD TEMPLE,
MOSES CHAPIN.